United States Patent
Asada et al.

(10) Patent No.: US 6,674,709 B1
(45) Date of Patent: Jan. 6, 2004

(54) OPTICAL HEAD APPARATUS

(75) Inventors: Junichi Asada, Ibaraki (JP); Seiji Nishiwaki, Osaka (JP); Yuichi Takahashi, Neyagawa (JP); Kenji Nagashima, Suita (JP); Hiroaki Matsumiya, Neyagawa (JP); Youichi Saitoh, Hirakata (JP); Kazuo Momoo, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/553,100

(22) Filed: Apr. 20, 2000

(30) Foreign Application Priority Data

Apr. 23, 1999 (JP) .......................... 11-115886
Oct. 5, 1999 (JP) .......................... 11-284357

(51) Int. Cl.[7] .............................. G11B 7/00
(52) U.S. Cl. .............................. 369/112.01; 369/112.18
(58) Field of Search .............. 369/53.26, 103, 369/112.03, 112.06, 112.1, 112.15, 112.18, 116, 118, 112.01, 112.04, 112.07

(56) References Cited

U.S. PATENT DOCUMENTS

| | | | | |
|---|---|---|---|---|
| 5,233,595 A | * | 8/1993 | Kawakubo | 369/116 |
| 5,373,519 A | * | 12/1994 | Siono et al. | 359/572 |
| 5,500,846 A | * | 3/1996 | Ophey | 369/116 |
| 5,600,621 A | * | 2/1997 | Noda et al. | 369/53.26 |
| 5,801,402 A | | 9/1998 | Shin | 257/80 |
| 6,084,844 A | | 7/2000 | Takeda | 369/112 |
| 6,463,023 B1 | * | 10/2002 | Miura | 369/53.26 |

FOREIGN PATENT DOCUMENTS

| | | |
|---|---|---|
| CN | 1159048 A | 9/1997 |
| CN | 1194434 A | 9/1998 |
| JP | 06290477 | 10/1994 |

OTHER PUBLICATIONS

Chinese Official Action dated Dec. 27, 2002, for Application No. 00106981.0 with English translation.

* cited by examiner

Primary Examiner—William Korzuch
Assistant Examiner—Bach Vuong
(74) Attorney, Agent, or Firm—RatnerPrestia

(57) ABSTRACT

To implement light quantity monitoring with high frequency responsivity and correction of astigmatic differences of a semiconductor laser with a simple configuration with fewer parts. Of the output from a semiconductor laser light source, a peripheral component is entered by a light reflection element into an anterior light monitoring photodetector formed in the vicinity of a semiconductor laser light source. Furthermore, the surface of the reflection sphere of the light reflection element is anamorphic, and thus condensed to an appropriate size on the photodetector without being focused, providing high frequency responsivity. Furthermore, the light reflection element is inclined at a predetermined angle to cancel out astigmatic differences of the optical semiconductor laser light source. In addition, the photodetector is placed so that reflected light is bent by an inclination of the light reflection element, reducing the amount of parallel displacement during adjustment of the light reflection element.

28 Claims, 13 Drawing Sheets

(a) Defocus position  (b) Focus position  (c) Defocus position

Photodetector

OPTICAL HEAD APPARATUS

BACKGROUND OF THE INVENTION

1. Field of the Invention

The present invention relates to an optical head apparatus that performs recording or reproduction of optical information recording media.

2. Description of the Prior Art

Generally, a rewritable type optical disc must monitor the quantity of incident light to the recording surface of the disc to secure the signal recording quality with high accuracy. For this reason, the accuracy of a system that monitors the light quantity using light output from the posterior end face of a laser chip used in a reproduction-only optical head is not high, and therefore it is necessary to monitor the light quantity using light radiated from the anterior end face of the laser chip (hereinafter referred to as "anterior light").

On the other hand, while optical discs are attracting attention as large-capacity information memories, optical head apparatuses need to attend a demand for high-speed recording or reproduction of optical discs. To meet this demand, it is necessary to increase the speed of modulation of a semiconductor laser light source and at the same time improve responsivity of the above described monitoring of the anterior light.

A conventional optical pick up will be explained with reference to the attached drawings below. FIG. 14 shows an example of an outlined configuration of a conventional optical head, apparatus. A diverging beam 802 radiated from a semiconductor laser light source 801 passes through a parallel flat plate 803 placed diagonally to the optical axis and is converted to a parallel beam 805 by a collimate lens 804.

This collimated beam 805 is partially reflected by a polarized beam splitter 806 and enters into a photodetector 809. A beam 810, the major portion of the collimated beam 805, passes through the polarized beam splitter 806 and is converted to a circularly polarized beam by a ¼ wavelength plate 811, and then condensed into an optical disc 814 through an objective lens 813 mounted on an actuator 812.

The beam reflected by the optical disc 814 passes through the objective lens 813 and is converted by the ¼ wavelength plate 811 to a linearly polarized beam, which is orthogonal to the polarization plane of the outgoing radiation beam of the semiconductor laser light source 801 and entered into the polarized beam splitter 806.

Since the polarization plane of the incident beam entered into the polarized beam splitter 806 is orthogonal to the first half of the optical path, the incident beam is reflected by the polarized beam splitter 806, diffracted by a hologram element 815, branched into a positive 1st-order diffracted light 817 and negative 1st-order diffracted light 818 with the optical axis of the incident light as an axis of symmetry, then condensed by a detection lens 817, entered into signal detectors 820 and 821, respectively, to detect control signals such as focusing and tacking, and RF signals.

On the other hand, photodetector 809 that detects light reflected by the polarized beam splitter 806 acts as an output light quantity monitor of the semiconductor laser light source 801.

Here, the reason why the parallel plate 803 is placed diagonally to the optical axis of the incident beam between the semiconductor laser light source 801 and collimate lens 804 will be explained. Generally, as for a semiconductor laser used for a light source of the optical head apparatus, from the standpoint of an optical characteristic, mode west of an oscillated beam of a semiconductor laser element 901 differs between the semiconductor composition plane (X-Z axial plane) and the plane normal thereto (Y-Z axial plane) as shown in FIG. 15.

That is, while the mode west is a point that matches a specular surface 902 within the perpendicular (Y-Z axial plane), it is a point inside an activated layer 903 of the semiconductor laser element 901, that is, a point at a certain depth from the specular surface 902 into the resonator within the composition plane (X-Z axial plane).

Therefore, the converging point of the oscillated beam differs between the composition plane (X-Z axial plane) and the plane normal thereto (Y-Z axial plane), and thus an "astigmatic difference" 904 in optical terms is produced.

When an astigmatic difference occurs, the beam spot is distorted into a flat, vertically or horizontally oblong spot. Therefore, the beam spot spans mutually neighboring recording tracks of an optical disc, causing a problem of deteriorating a signal characteristic.

It is for this reason that in FIG. 14, the parallel plate 803 is placed inclined at a predetermined angle in the reverse direction in order to correct the astigmatism of the light beam radiated from the semiconductor laser 801.

Moreover, another method proposed to correct such astigmatism of a light beam is canceling out the astigmatism of the light spot by inserting a cylindrical lens in the same optical path of the laser beam.

BRIEF SUMMARY OF THE INVENTION

Object of the Invention

The above described conventional optical head apparatus has the following problems:

Generally, when recording a signal on a rewritable type optical disc, it is necessary to secure sufficient optical power on the disc, and therefore the light utilization efficiency of the optical head must be secured.

However, the configuration of the above described conventional example performs no beam shaping, and therefore abandons a portion of light in the outer regions for reasons related to the design of the objective lens, which means a loss of light quantity.

Furthermore, a part of the beam within the effective aperture is reflected and used by the photodetector 809 to monitor the light quantity, which increases the loss all the more. To avoid this, lowering the light quantity to be conducted to the light quantity monitor and increasing the light quantity within the effective aperture will deteriorate the S/N ratio of the monitor signal.

Moreover, increasing the speed of laser modulation requires the responsivity of the anterior light monitor itself to be improved. For this reason, it is preferable to reduce the photoreception area of the photodetector and input a condensed beam in order to improve the response frequency characteristic of optical detection.

However, exposing the photodetector to an excessively condensed beam will increase the light intensity per unit area of the detector surface, increasing the carrier density on the photoreception surface of the detector, which then becomes saturated causing the traveling speed of carriers to slow down. That is, condensing the beam on the detector excessively may cause a problem of deteriorating the response frequency characteristic of optical detection.

Furthermore, all the above described methods to correct the astigmatism of a light beam produced by an astigmatic difference among the semiconductor laser elements above must provide special parts such as a transparent parallel plate and cylindrical lens separately, causing an additional problem of unavoidably increasing the number of parts, hence cost increase.

In addition, since the photodetector for an RF signal, focusing or tracking control signals is provided apart from the photodetector for laser light quantity monitoring, which increases the number of parts and complicates the optical system, making it difficult to reduce the size of the optical head.

The present invention has been implemented taking into account these problems of the conventional optical head apparatus and it is an object of the present invention to provide an optical head apparatus with high light utilization efficiency.

It is another object of the present invention to provide a compact optical head apparatus.

It is still another object of the present invention to provide an optical head apparatus with an excellent response frequency characteristic of optical detection.

SUMMARY OF THE INVENTION

Therefore one aspect of the present invention is an optical head apparatus, comprising:
  a semiconductor laser light source;
  a photodetector that receives at least one part of light from said semiconductor laser light source;
  a light reflection element provided with a peripheral section that reflects peripheral light of to the light from said semiconductor laser light source and condenses it into said photodetector and a central section that transmits central light of the light from said semiconductor laser light source; and
  a condenser lens that condenses the light that passes through said light reflection element onto an optical disc,
  wherein:
    each surface of the central section of said light reflection element has a flat shape; and
    at least one surface of the peripheral section of said light reflection element has a spherical or non-spherical shape.

Therefore another aspect of the present invention is an optical head apparatus, comprising:
  a semiconductor laser light source;
  a photodetector that receives at least one part of light from said semiconductor laser light source;
  a light reflection element provided with a function of reflecting peripheral light of the light from said semiconductor laser light source and condensing it into said photodetector and a function of transmitting the central light of the light from said semiconductor laser light source; and
  a condenser lens that condenses the light that passes through said light reflection element onto an optical disc,
  characterized in that said semiconductor laser light source and said photodetector are formed in one package.

Therefore still another aspect of the present invention is an optical head apparatus, comprising:
  a semiconductor laser light source;
  a plurality of photodetectors placed adjacent to said semiconductor laser light source;
  a reflection type hologram element provided with a peripheral section that reflects and diffracts peripheral light of the light from said semiconductor laser light source and condenses it into one of said plurality of photodetectors and a central section that transmits central light of the light from said semiconductor laser light source; and
  a condenser lens that condenses the light that passes through the central section of said reflection type hologram element onto an optical disc,
  wherein:
    said photodetector that receives said reflected and diffracted light is placed closer, with respect to said semiconductor laser light source, in the direction of the major axis of an ellipse than in the direction of the minor axis of the ellipse of an elliptic far field pattern of outgoing light from said semiconductor laser light source; and
    the photodetector that receives signal light from said optical disc is placed closer, with respect to said semiconductor laser light source, in the direction of the minor axis of the ellipse than in the direction of the major axis of the ellipse of an elliptic far field pattern of outgoing light from said semiconductor laser light source.

| | (Description of Symbols) |
|---|---|
| 1 | Laser light source |
| 2 | Reflection type hologram element |
| 3 | Collimate lens |
| 4 | Objective lens |
| 5 | Polarized hologram element |
| 6 | Anterior light monitoring photodetector |
| 7 | Signal detection photodetector |
| 8 | Optical disc plane |
| 9 | Actuator |
| 10 | Reflection hologram |
| 101 | Semiconductor laser light source |
| 102 | Divergent light |
| 103 | Photodetector |
| 104 | Collimate lens |
| 105 | Parallel light |
| 106 | Polarized beam splitter |
| 107 | Light reflection element |
| 108 | Reflected light |
| 109 | Optical integrated module |
| 110 | Transmission light |
| 111 | ¼ wavelength plate |
| 112 | Actuator |
| 113 | Objective lens |
| 114 | Optical disc |
| 115 | Hologram element |
| 116 | Detection lens |
| 117 | Positive 1st order diffracted light |
| 118 | Negative 1st order diffracted light |
| 119 | Signal detector |
| 120 | Signal detector |
| 201 | Laser optical axis |
| 202 | Transmission plane |
| 203 | Aluminum-evaporated plane |
| 407 | Light reflection element |
| 607 | Reflection type hologram element |
| 608 | Reflected/diffracted light |
| 701 | Laser optical axis |
| 702 | Transmission plane |
| 703 | Reflection hologram plane |
| 801 | Semiconductor laser light source |
| 802 | Divergent light |
| 803 | Parallel plate |
| 804 | Collimate lens |
| 805 | Parallel light |
| 806 | Polarized beam splitter |
| 807 | Reflected light |
| 809 | Optical integrated module |
| 810 | Transmission light |
| 811 | ¼ wavelength plate |
| 812 | Actuator |
| 813 | Objective lens |
| 814 | Optical disc |
| 815 | Hologram element |
| 816 | Detection lens |
| 817 | Positive 1st order light |
| 818 | Negative 1st order light |
| 819 | Signal detector |
| 820 | Signal detector |

DETAILED DESCRIPTION OF THE PREFERRED EMBODIMENTS

With reference now to FIG. 1 through FIG. 7, embodiments of the present invention will be explained below. Detailed explanations of the parts that have the same functions as those in the conventional example will be omitted.

Figure 1:
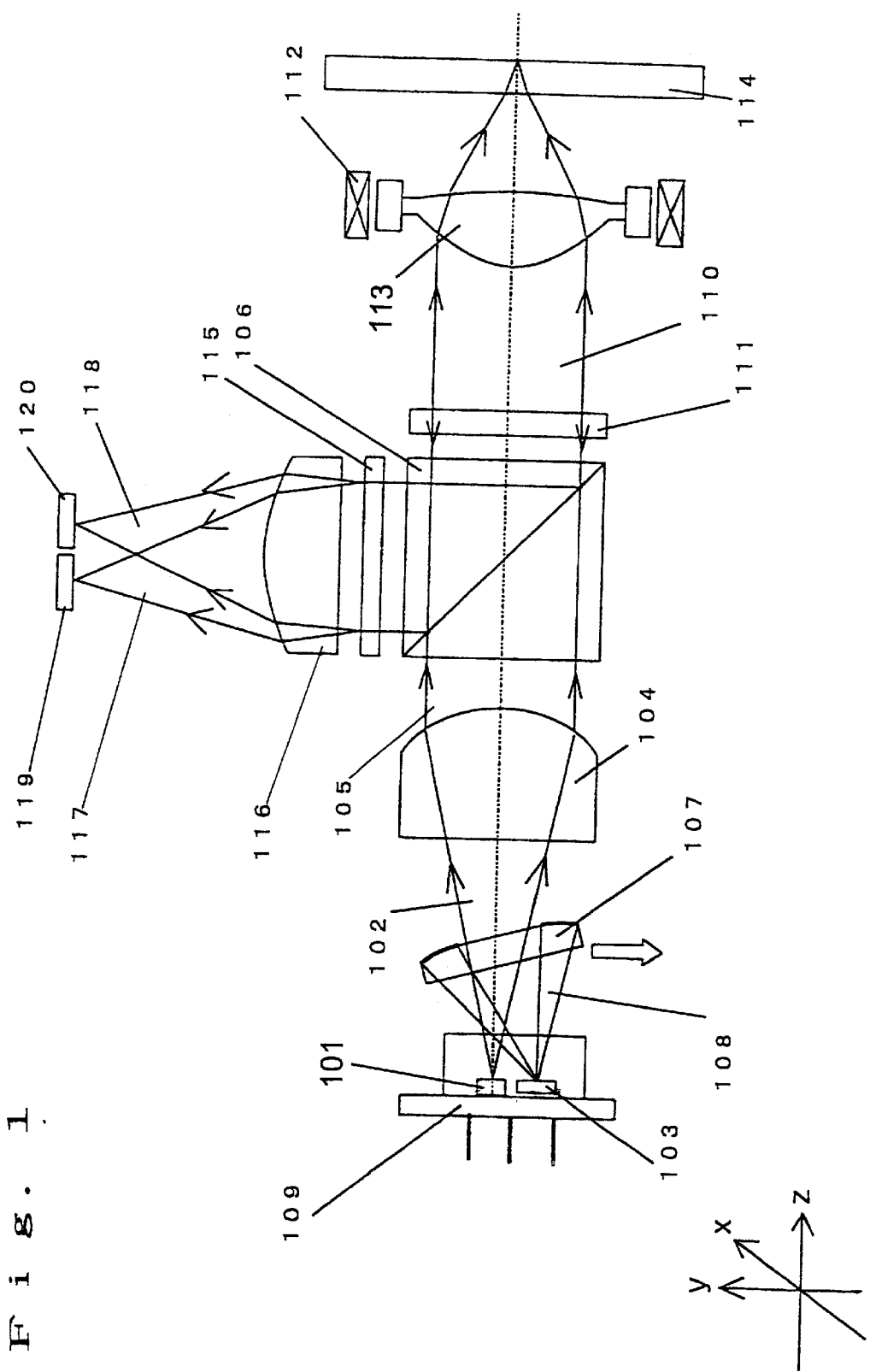
FIG. 1 is an outlined configuration of an optical head according to an embodiment of the present invention.
Figure 2:
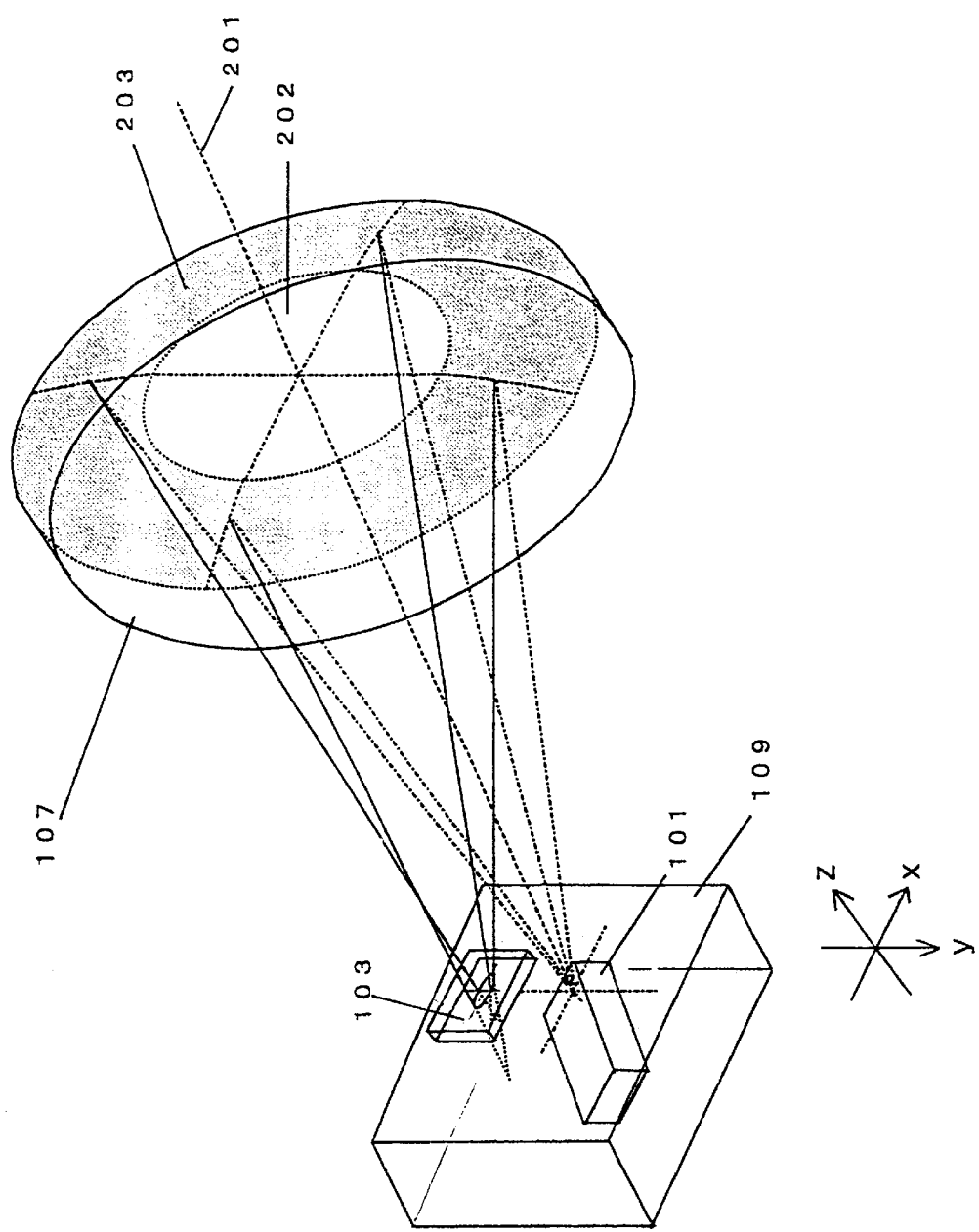
FIG. 2 is a drawing showing a configuration of elements used in the above embodiment of the present invention.

FIG. 1 shows an outlined configuration of the optical head apparatus of an embodiment of the present invention and FIG. 2 shows the configuration of a light reflection element, laser and photodetector that are used as components of optical head apparatus. A light reflection element 107 used in the configuration in FIG. 1 is made of glass and provided with a flat shaped transmission plane 202 at its center section (corresponding to the central section in the present invention) with a centered laser optical axis 201, and a non-spherically formed aluminum-evaporated plane 203 at a ring-figured area (corresponding to the peripheral section of the present invention) surrounding said transmission plane 202 as shown in FIG.2.

Among the light beam radiated from the semiconductor laser light source 101 in FIG. 1, the peripheral beam component is reflected and condensed by the light reflection element 107 and condensed into a photodetector 103 for anterior light monitoring formed in the vicinity of the semiconductor laser light source 101. The semiconductor laser light source 101 and photodetector 103 for anterior light monitoring are integrated into an optical integrated module 109 for the purpose of reducing the size and weight.

On the other hand, the beam at the central section is collimated by a collimate lens 104 into a parallel beam, passes through a polarized beam splitter 106, and is condensed by an objective lens 113 mounted on an actuator 112 onto the surface of an optical disc 114.

The beam reflected by the optical disc 114 passes through the objective lens 113 and is converted by a ¼ wavelength plate 111 to linearly polarized light orthogonal to the polarization plane of the semiconductor laser outgoing radiation beam and is entered into the polarized beam splitter 106.

Since the polarization plane of the incident beam entered into the polarized beam splitter 106 is orthogonal to that in the case of the first half of the optical path, the incident beam is reflected by the polarized beam splitter 106 and diffracted by a hologram element 115. The diffracted beam is branched into a positive 1st-order diffracted light 117 and negative 1st-order diffracted light 118 with the optical axis of the incident light as an axis of symmetry, then is condensed by a detection lens 116, entered into signal detectors 119 and 120, respectively, and used for control signals such as focusing and tacking, and RF signals.

The astigmatism of the light beam radiated from the semiconductor laser 101 is compensated by inclining the light reflection element 107 at a predetermined angle.

Moreover, as shown in FIG. 1, due to an inclination of the light reflection element 107, the optical axis of the reflected light 108 is inclined with respect to the optical axis of the light from the semiconductor laser light source. The photodetector 103 is placed in the direction of the reflected light 108. Here, when manufacturing, it is necessary to adjust so that the reflected light 108 enters into the photodetector 103. For this purpose, it is necessary to adjust the central axis of the reflection spherical plane of the light reflection element 108 through parallel displacement of the central axis in the direction indicated by an arrow in FIG. 1 as appropriate. The above described inclination of the photodetector 103 reduces the amount of parallel displacement compared to the case without the inclination.

The ability to reduce the amount of parallel displacement for adjustment can reduce the area of the central flat section of the light reflection element 107, form a wider light reflection surface of the peripheral section and capture more reflected light. This is because larger parallel displacement for adjustment requires the central flat section of the light reflection element 107 to be designed with more allowance beforehand.

Furthermore, since it is possible to design a smaller angle of reflection of the reflection spherical surface, the reflection plane of the light reflection element 107 becomes a spherical plane with smaller curvature, making it easier to shape the reflection plane.

Figure 3:
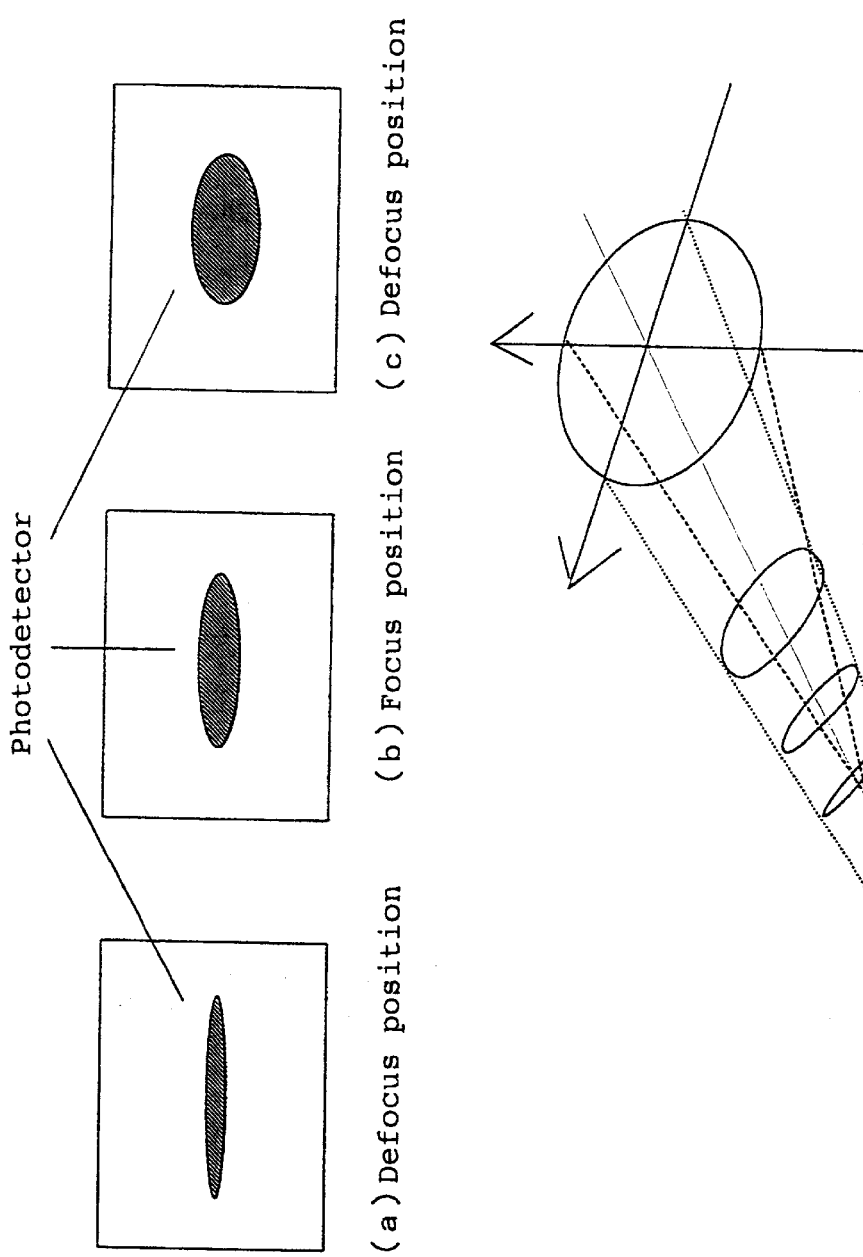
FIG. 3 a schematic drawing of spot shapes of the above embodiment of the present invention.

Furthermore, if the peripheral section of the light reflection element 107 is formed in an anamorphic, non-spherical shape, as shown in FIG. 2, the focus onto which light is reflected and condensed by the light reflection element 107 differs between the x-z axial plane and the y-z axial plane normal thereto in FIG. 2. That is, the focus of spots on the surface of the photodetector 103 has an astigmatic difference as shown in FIG. 3. Even if defocusing occurs due to errors in mounting optical parts, etc., the astigmatic difference increases the light intensity per unit area of the surface of the photodetector, and prevents deterioration of frequency responsivity caused by concentration of carriers.

Figure 4:
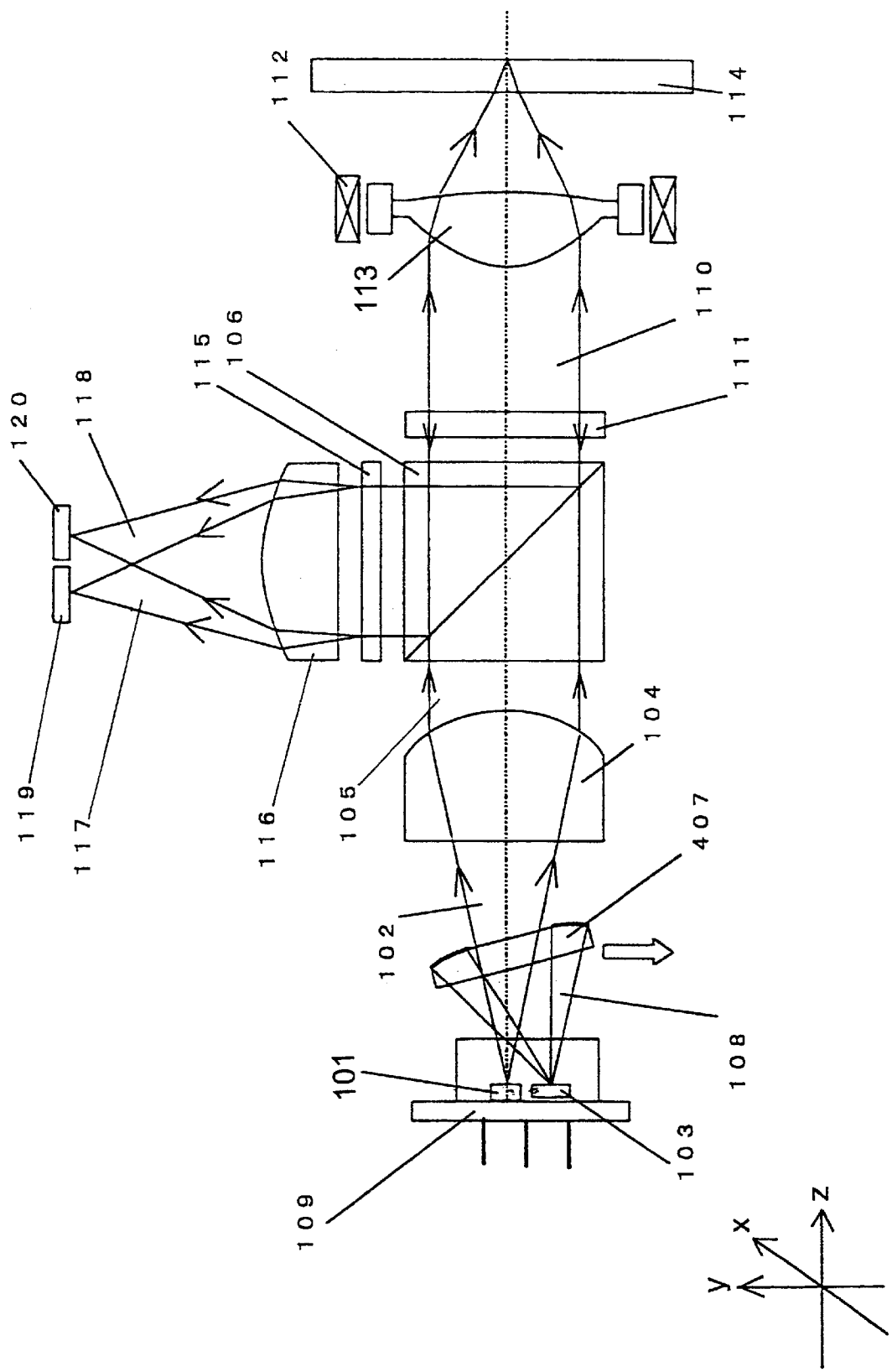
FIG. 4 an outlined configuration of an optical head according to another embodiment of the present invention.
Figure 5:
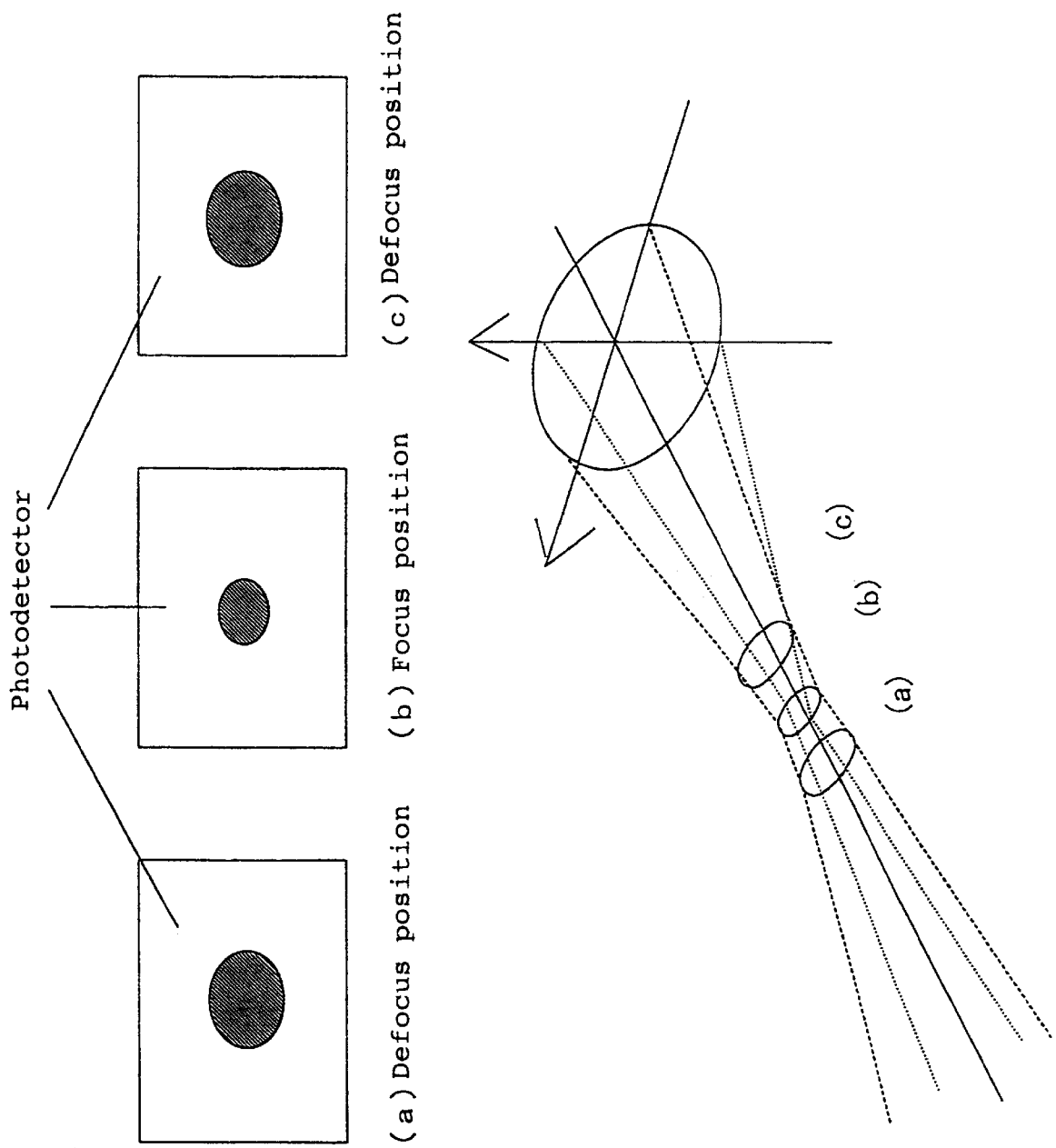
FIG. 5 a schematic drawing of spot shapes of the above embodiment of the present invention.

FIG. 4 shows an embodiment using a light reflection element 407 with reflected and converged light having a spherical aberration instead of the light reflection element 107 with reflected and converged light having an astigmatic difference in the embodiment of FIG. 1. In this case, the spot focus on the surface of the photodetector 103 has a spherical aberration as shown in FIG. 5. With this, even if defocusing occurs due to errors in mounting optical parts, etc., it is possible to maintain lower light intensity per unit area of the surface of the photodetector than spots without spherical aberration, and prevent deterioration of frequency responsivity caused by concentration of carriers.

Figure 6:
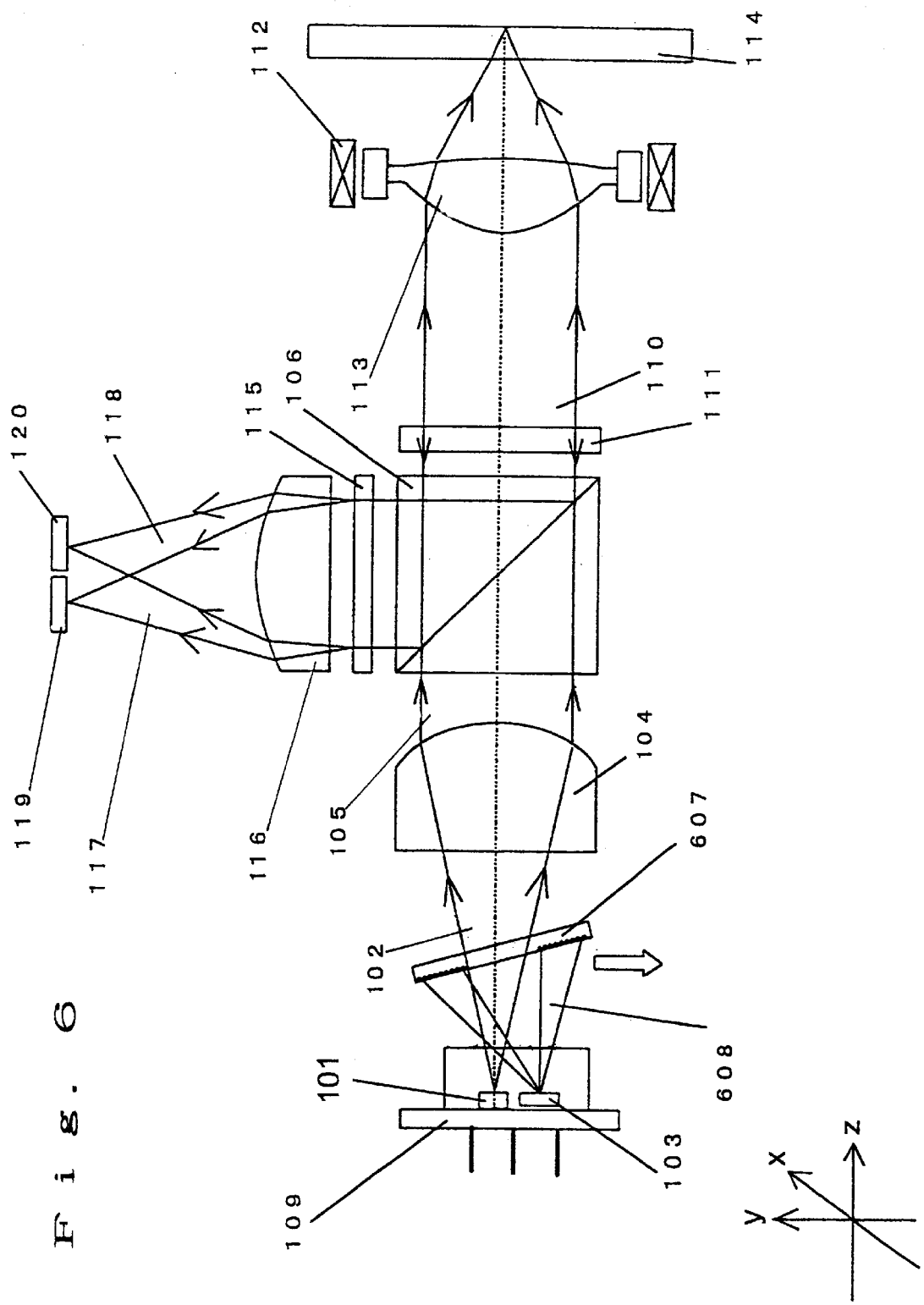
FIG. 6 an outlined configuration of an optical head according to another embodiment of the present invention.
Figure 7:
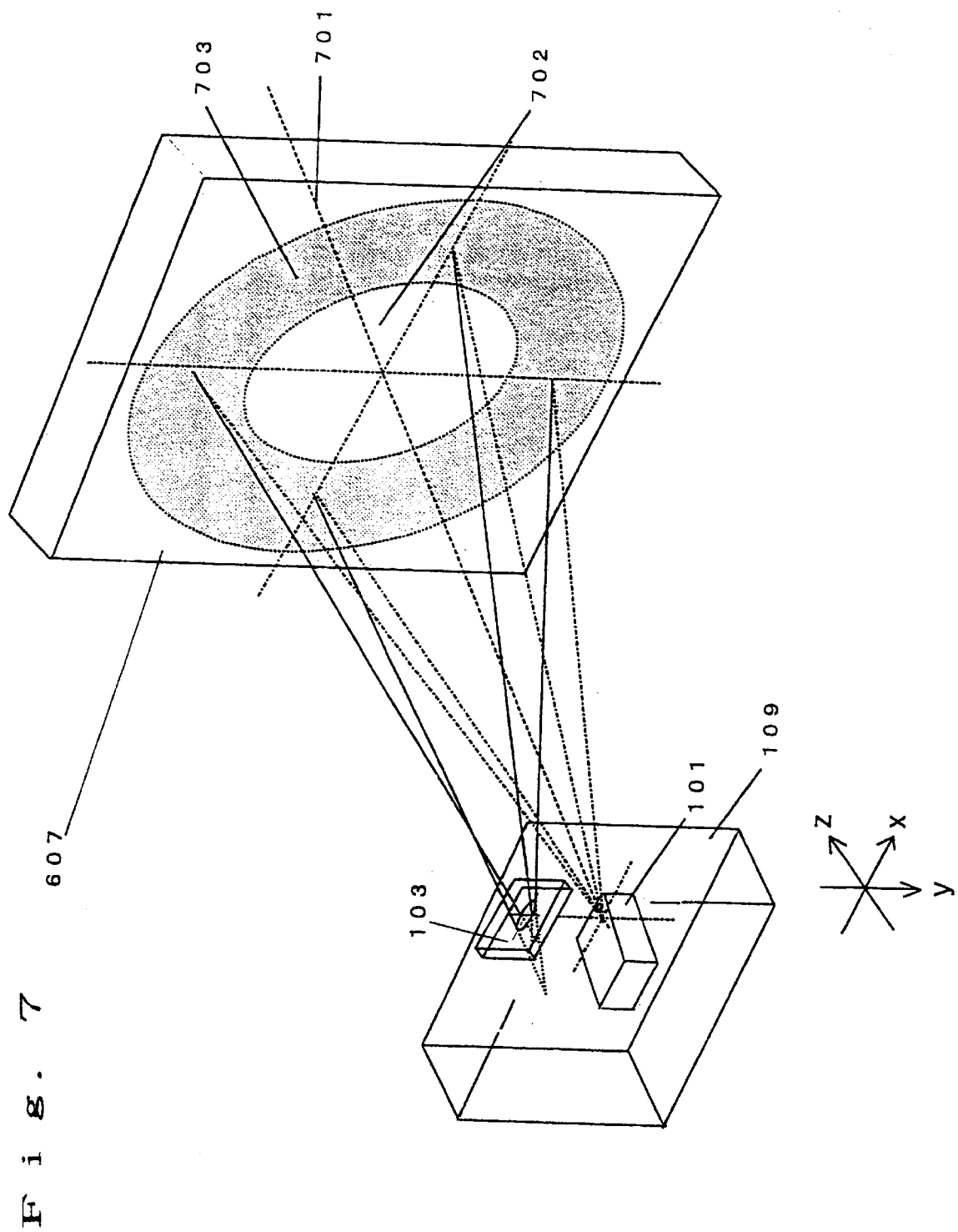
FIG. 7 a drawing showing a configuration of elements used in the above embodiment of the present invention.

FIG. 6 shows a schematic drawing of another embodiment of the present invention. A reflection type hologram element 607 used in the configuration in FIG. 6 is provided with a reflection hologram plane 703 formed in a ring-figured area (corresponding to the peripheral section of the present invention) at the peripheral section for a laser optical axis 701 as a center position as shown in FIG. 7 and there is a circular light transmission area 702 (corresponding to the central section in the present invention) in the vicinity of the laser optical axis 701.

Among the light beam radiated from the semiconductor laser light source 101 in FIG. 6, the peripheral beam component is reflected and diffracted by the reflection hologram 607. The pitch and groove orientation of this reflection type hologram are different depending on the incident light and incident position of the laser beam and the reflected/diffracted beam 608 is condensed into the photodetector 103 placed in the vicinity of the semiconductor light source 101.

Furthermore, since this reflection type hologram element 607 is formed to have an astigmatic difference as in the case of the above described light reflection element 107, a spot beam does not form a focus but focal line. With this, even if defocusing occurs due to errors in mounting optical parts, etc., it is possible to maintain lower light intensity per unit area of the surface of the photodetector than spots without astigmatic differences, and prevent deterioration of frequency responsivity caused by concentration of carriers.

Furthermore, for manufacturing adjustment, it is necessary to enter the reflected/converged light from the reflection type hologram element 607 into the photodetector through parallel displacement of the reflection type hologram element 607 in the direction indicated by an arrow in FIG. 6. In this case, as shown in FIG. 6, placing the photodetector 103 in the direction that the light is reflected by the inclined reflection type hologram element 607 can reduce the amount of parallel displacement to adjust the reflection type hologram element 607.

This can reduce the angle of diffraction of the reflection type hologram element 607 compared to the case where the reflection type hologram element 607 is not inclined and allows the reflection type hologram element 407 to be designed with a wider pitch, securing an advantage in respect of hologram elaboration pitch limitations.

Here, in the embodiment in FIG. 6, it goes without saying that using a light reflection element with the reflected/diffracted light having a spherical aberration instead of the reflection hologram element 607 with the reflected/diffracted light having an astigmatic difference will also obtain effects similar to those in the embodiment in FIG. 4.

Figure 8A:
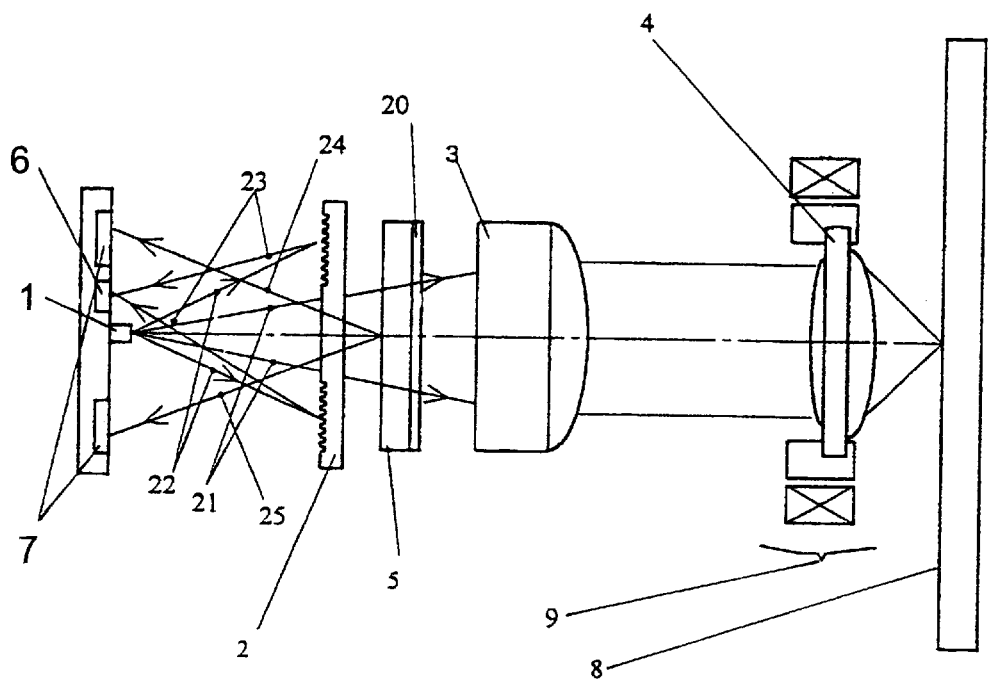
FIG. 8 a configuration diagram of an optical head apparatus of another embodiment of the present invention.
Figure 8B:
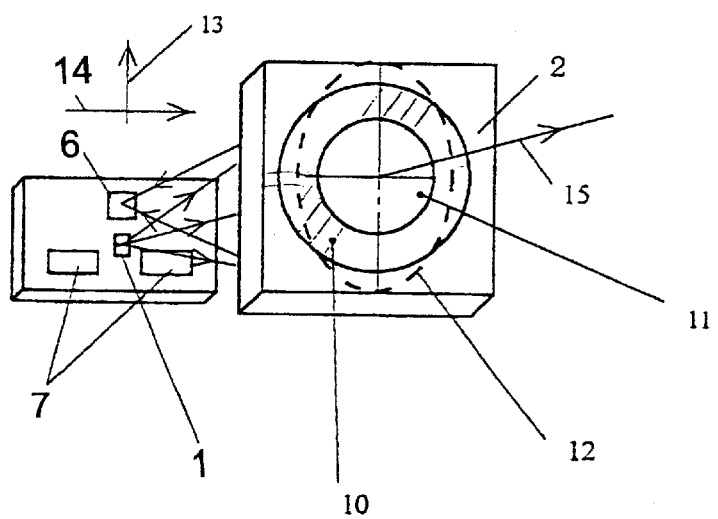

FIG. 8(a) shows an outlined configuration of the optical head apparatus according to another embodiment of the present invention and FIG. 8(b) shows a layout of the reflection type hologram element, laser and photodetector used as its components.

The reflection type hologram element 2 used in the configuration in FIG. 8(a) consists of a reflection type hologram 10 formed in a ring-figured area in the outer circumference for the laser optical axis 15 as a central position and a circular light transmission area 11 in the vicinity of the laser optical axis 15 as shown in FIG. 8(b)

Of the light beam radiated from the semiconductor laser light source 1 in FIG. 8(a), the peripheral beam component 22 is reflected and diffracted by the reflection type hologram 10. The pitch and groove orientation of this reflection hologram are different depending on the incident light and incident position of the laser beam and the reflected/diffracted beam 23 is condensed into the photodetector 6 for anterior light monitoring placed in the vicinity of the semiconductor light source 1.

On the other hand, among the beam radiated from the semiconductor laser light source, the inner beam component passes through the reflection type hologram element 2 with restricted aperture, polarized hologram element 5 and ¼ wavelength plate 20, and is converted to a parallel beam by a collimate lens 3, and then condensed into an optical disc 8 through an objective lens 4 mounted on an actuator 9.

The beam reflected by the optical disc 8 is diffracted by the objective lens 4, collimate lens 3, ¼ wavelength plate 20 and polarized hologram element 5 and entered into a signal detection photodetector 7 formed around the semiconductor laser light source 1 for detection of signals such as RF signal, focusing and tracking control signals.

With such a configuration using outer circumferential light component that is originally not used for anterior light monitoring, the present embodiment can improve the light utilization efficiency of the optical head and integrate all the semiconductor laser light source 1, signal detection detector 7, detector 6 for anterior light monitoring in a single unit, thus reducing the number of parts of the optical head apparatus.

Furthermore, the reflection type hologram 10 having a condensing function allows light beam to be condensed into a photodetector with a small area without another condensing means such as a lens, simplifying and reducing the size of the optical head apparatus while securing high-speed responsivity of anterior light monitoring.

Here, as shown in FIG. 8(b), the semiconductor laser light source 1, anterior light monitoring photodetector 6 and signal detection photodetector 7 are configured as follows:

That is, for a laser outgoing radiation far field pattern 12 as shown by dotted line in FIG. 8(b), the anterior light monitoring photodetector 6 is placed in the direction close to the direction 13 of the major axis of the ellipse and signal detection photodetector 7 to detect signals from the optical disc is placed in the direction 14 close to the direction of the minor axis of the ellipse.

That is, the anterior light monitoring photodetector 6 is placed close to the direction of the major axis of the ellipse rather than the minor axis with respect to the optical axis of the light from the semiconductor laser light source. On the other hand, the photodetector 7 for signal detection is placed close to the direction of the minor axis of the ellipse. For example, it is preferable that they be placed in the direction of the major axis and minor axis of the ellipse, respectively.

That is, such a configuration has the following effects. The reflection hologram 10 produces a beam with the order which diffracts toward the anterior light monitoring photodetector 6, a beam with the order which diffracts in its opposite side and a 0-order diffracted beam, but since unnecessary beams other than the beam with the order which diffracts toward the anterior light monitoring photodetector 6 travel in the direction of the major axis of the ellipse of the far field pattern, these beams are not entered into the photodetector 7 to detect a signal from the optical disc as stray light.

Furthermore, since each photo detector can be placed close to the laser chip, requiring only a small angle of diffraction by the reflection hologram 10 or polarized hologram element 5, it is possible to have a large hologram pitch and secure sufficient allowance for hologram elaboration pitch limitations.

Figure 9:
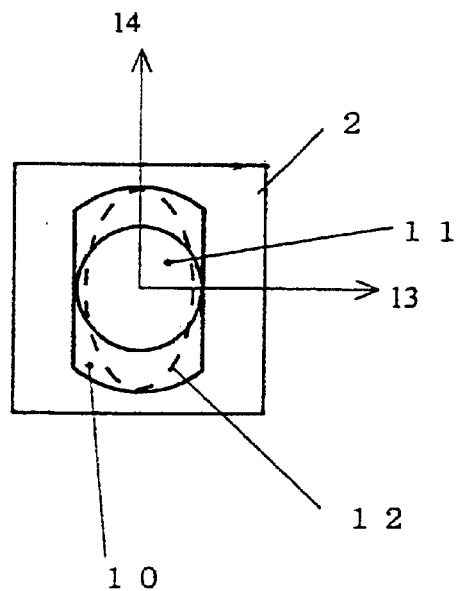
FIG. 9 a plan view of a reflection type hologram according to another embodiment of the present invention.

FIG. 9 shows a plan view of the reflection type hologram element 2 according to another embodiment of the present invention which sets the spreading angle of a laser light source, the hologram area and a relative distance between the light source and hologram so that more light in the major axis of the ellipse of the outgoing radiation far field pattern 12 of the semiconductor laser light source is reflected and diffracted.

Generally, a density distribution of a semiconductor laser changes due to temperature variations more in the direction of the minor axis than in the direction of the major axis. This change affects the linearity of the light quantity of anterior light monitoring and the light quantity of light passing through the reflection hologram element 2. Therefore, for a system requiring control of light quantity with very high accuracy as in the case of the present embodiment, it is preferable to use only light in the direction of the major axis as the light for anterior light monitoring. That is, the hologram 10 formation area of the reflection type hologram element 2 is formed more widely in the direction of the major axis of the ellipse with respect to the center of the axis of the elliptic far field pattern of the above described semiconductor laser.

Figure 10:
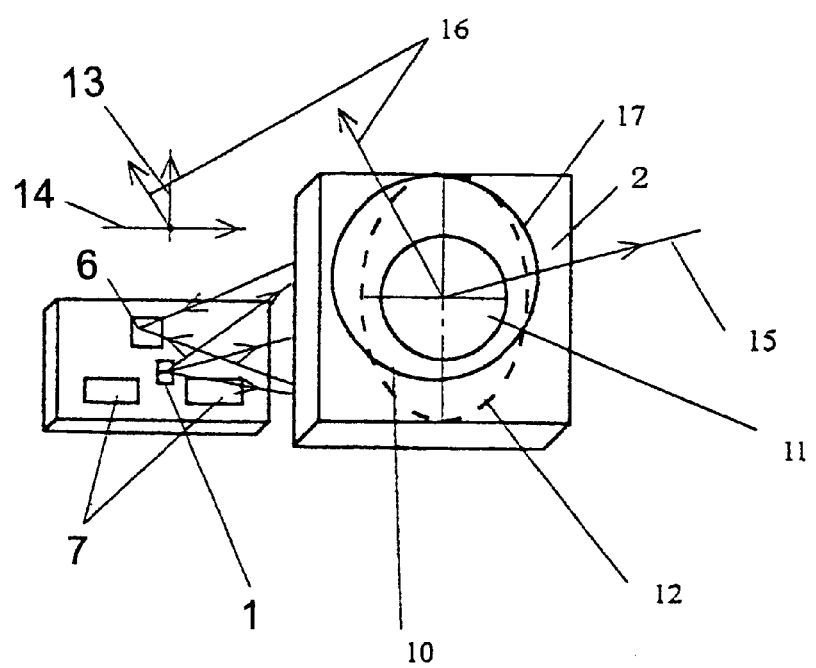
FIG. 10 a layout of a reflection type hologram element, laser light source and photodetector according to another embodiment of the present invention.

FIG. 10 shows a plan view of the reflection type hologram and the location of the photodetector in another embodiment of the present invention. In the present embodiment, the area of the reflection type hologram 10 is formed asymmetric with respect to a point centered on the laser optical axis 15. That is, if a laser beam is reflected/diffracted by the anterior light monitoring photodetector 6, which is deviated from the laser optical axis 15, the hologram pitch varies sequentially depending on its incidence angle and position. However, since this pitch also has elaboration limitations, the area is subject to these limitations.

However, some directions allow a large distance from the optical axis to the pitch elaboration limitations, and therefore it is possible to increase the light quantity of reflected/diffracted light for anterior light monitoring by forming the reflection type hologram 10 up to the boundary 17 of the elaboration pitch limitations indicated by the area asymmetric with respect to a point as shown in FIG. 10.

Figure 11A:
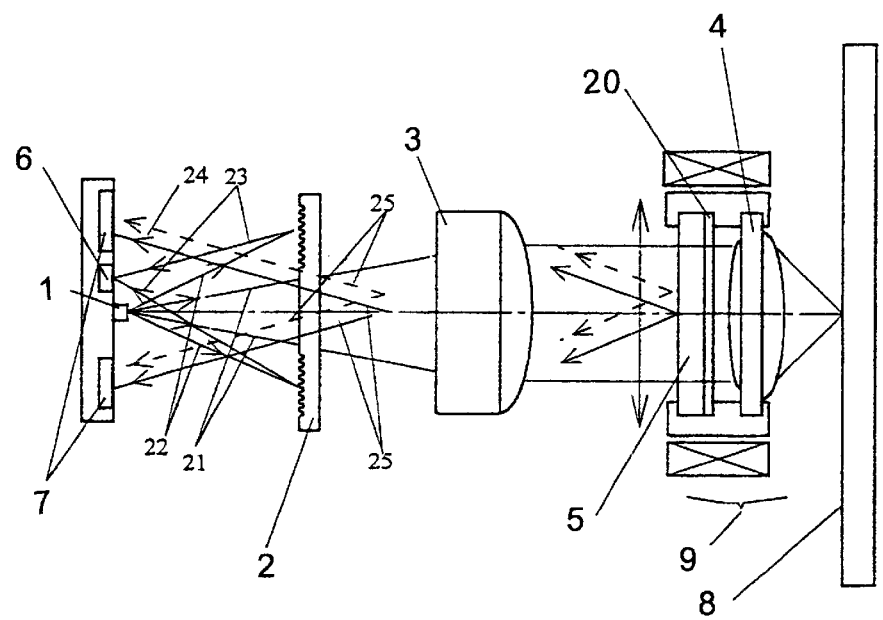
FIG. 11 a configuration diagram of an optical head according to another embodiment of the present invention.
Figure 11B:
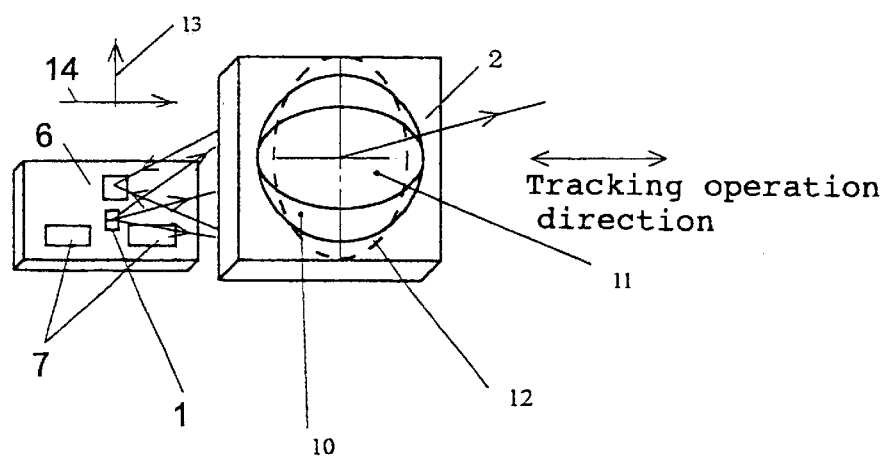

FIG. 11(a) shows an optical head apparatus in another embodiment of the present invention and FIG. 11(b) shows a plan view of a reflection type hologram element used for its configuration.

As shown in FIG. 11(b), the reflection type hologram element 2 has an oval or slotted-hole shaped light transmission area 11 at the center. In FIG. 11(a), a polarized hologram element 5 and ¼ wavelength plate 20 to diffract the reflected light from the optical disc and lead it to the photodetector 7 for detection of signals such as focusing and tracking are mounted together with an objective lens 4 on the movable part of an objective lens actuator 9.

Therefore, when the objective lens 4 moves in the direction orthogonal to the track in order to follow up tracking errors due to eccentricity of the optical disc, the light 25 diffracted by the polarized hologram element 5 also moves together (solid arrow 25 → dotted line arrow 25').

According to the reflection type hologram element 2 in FIG. 11(b), the light transmission area 11 of the reflection hologram 10 extends widely in this direction of movement, and therefore it is possible to implement a structure that prevents shading the signal detection light minimizing the reduction of light quantity of reflected/diffracted light for anterior light monitoring. FIG. 11(a) and FIG. 11(b) depict tracking operation directions with the vertical and horizontal directions reversed.

Figure 12:
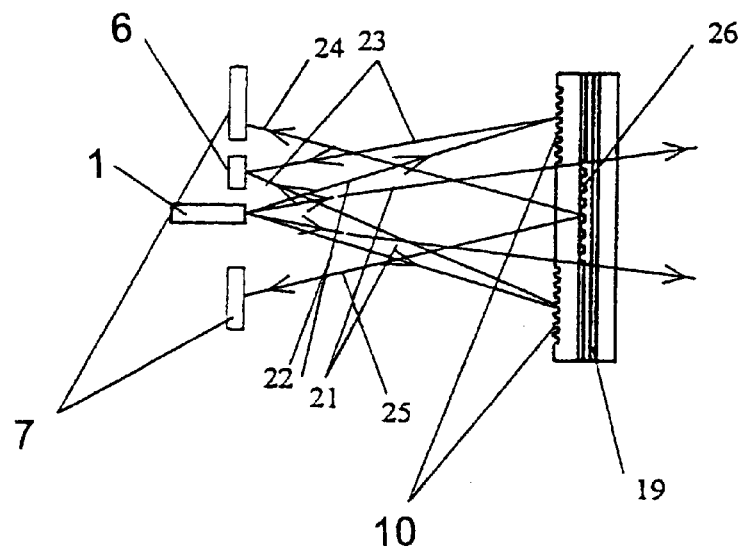
FIG. 12 a layout of a reflection type hologram element, laser light source and photodetector according to another embodiment of the present invention.

FIG. 12 shows a part of the optical head apparatus of another embodiment of the present invention. In FIG. 12, a polarized hologram element is formed with a polarized hologram layer 26 and ¼ wavelength film 19 sandwiched between two glass plates. Furthermore, a reflection type hologram 10 is formed on a glass substrate on the other side.

This allows the elements to be integrated and simplifies the configuration of the optical head and at the same time allows, when the reflected/diffracted light spot of the reflection type hologram 10 is positioned on the monitoring photodetector, the signal detection hologram to be positioned simultaneously, making it possibly to simplify adjustment in the optical head manufacturing process.

Figure 13:
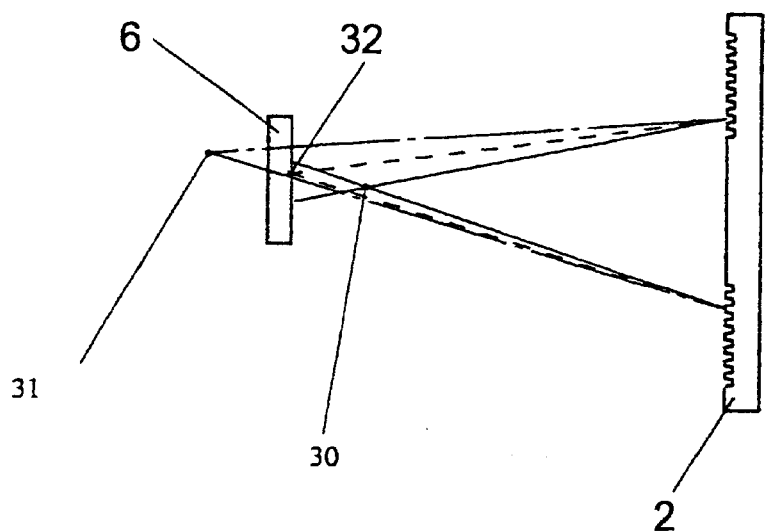
FIG. 13 a layout of a reflection type hologram element and photodetector according to another embodiment of the present invention.
Figure 14:
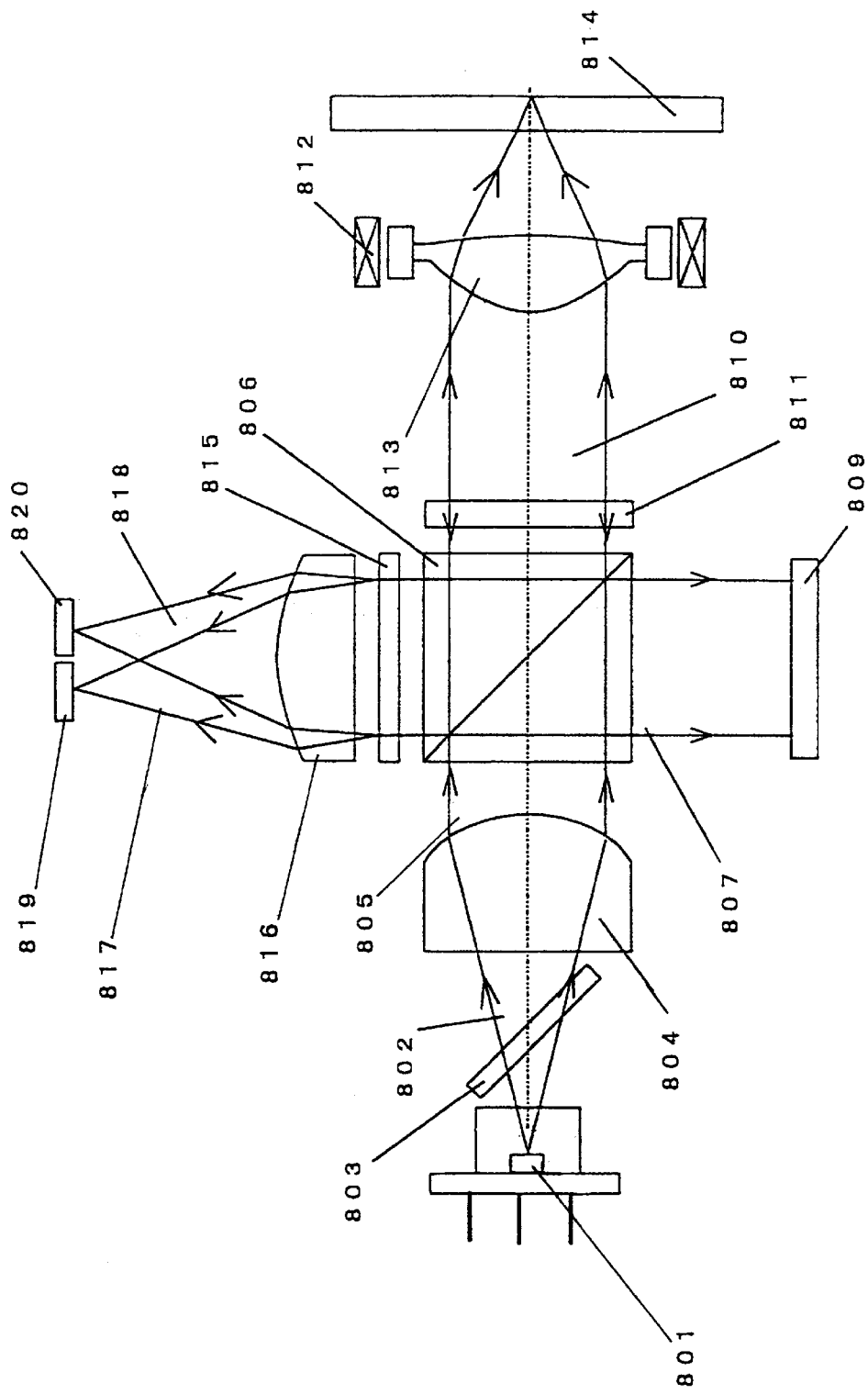
FIG. 14 a drawing showing a conventional optical head apparatus.
Figure 15:
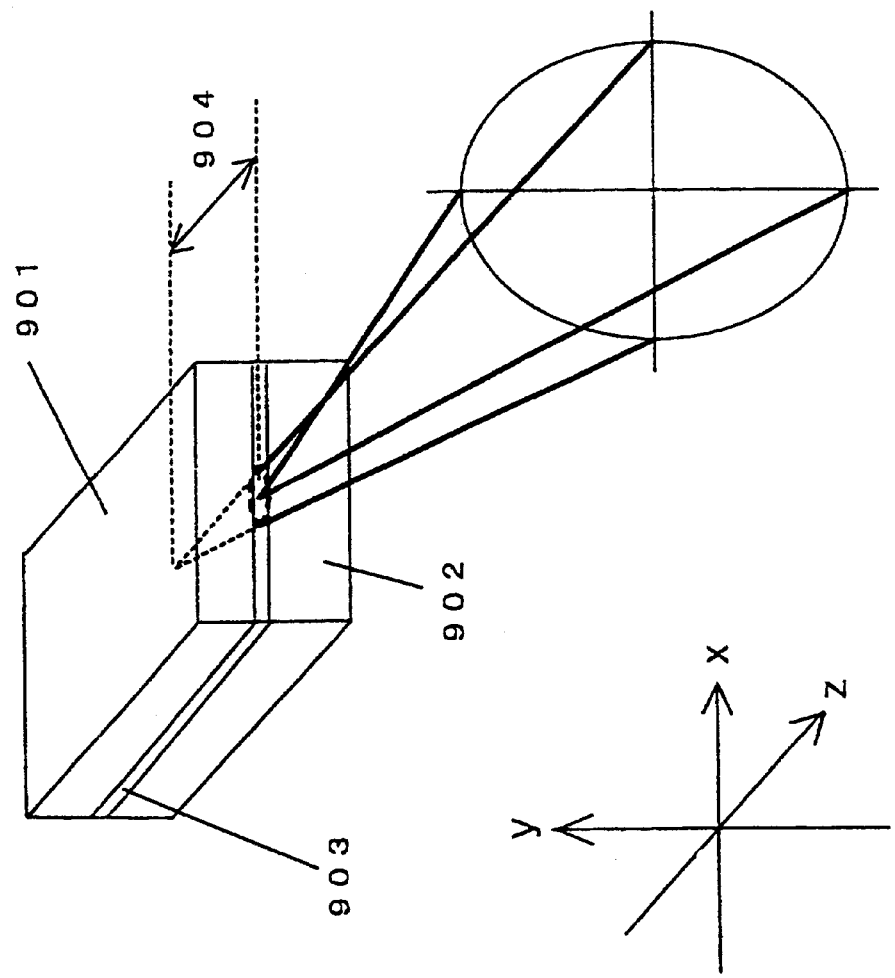
FIG. 15 a schematic drawing showing an astigmatic difference of a semiconductor laser.

FIG. 13 shows a reflection type hologram element 2, anterior light monitoring photodetector 6 and light beam diffracted by the reflection type hologram of the optical head apparatus according to another embodiment of the present invention.

As shown in FIG. 13, the condensing point of the light beams reflected and diffracted by the reflection type hologram element 2 is defocused before and after the photodetector 6 because the wavelength of the laser light source fluctuates due to temperature variations, etc.

In order to prevent the light beam from going off the edge of the anterior light monitoring photodetector 6 due to such defocusing, it is preferable to design so that the condensing point matches the plane of the photodetector at a midpoint 32 between a focus point 31 at the minimum temperature in the operating temperature range of the optical head and a focus point 30 at the maximum temperature. This reduces variations of the monitoring light quantity even with variations in the laser wavelength, allowing stable control of light quantity within the guaranteed temperature range of the product.

As described above, the optical head apparatus of the present invention can implement anterior light monitoring with high-speed responsivity by condensing a beam to a predetermined size on a photodetector, correct an astigmatic difference of a semiconductor laser using this light reflection element and integrate the semiconductor laser and photodetector in a single unit, thus making it possible to simplify and reduce the size of the optical head.

Furthermore, the configuration according to the present invention monitors the light quantity of laser radiating beams by effectively utilizing light beams outside the aperture, making it possible to reduce loss of light quantity, increase the monitoring light quantity by optimizing the area and location of the reflection/diffraction grating, thus providing a high S/N ratio of monitor signals.

Furthermore, since the reflection type hologram itself provides high-level condensing, it is possible not only to reduce the size of optical spots on the photodetector but also reduce the optical detection area, making it possible to implement anterior light monitoring with high-speed responsivity and stabilize the recording quality by the recording type optical head such as DVD-RAM.

Furthermore, the present invention can simplify and reduce the size of the optical head by integrating the anterior light monitoring photodetector, laser chip and signal detection photodetector, etc. in a single unit.

What is claimed is:

1. An optical head apparatus, comprising:
   a semiconductor laser light source;
   a photodetector that receives at least one part of light from said semiconductor laser light source;
   a light reflection element provided with;
   a peripheral section that reflects peripheral light of the light from said semiconductor laser light source and condenses it into said photodetector, a condensing function of the peripheral section of said light reflection element has an astigmatic difference; and
   a central section that transmits central light of the light from said semiconductor laser light source; and
   a condenser lens that condenses the light that passes through said light reflection element onto an optical disc,
   wherein:
     each surface of the central section of said light reflection element has a flat shape; and
     at least one surface of the peripheral section of said light reflection element has a spherical or non-spherical curved shape.

2. The optical head apparatus according to claim 1, characterized in that the condensing function of the peripheral section of said light reflection element has a spherical aberration.

3. An optical head apparatus, comprising:
   a semiconductor laser light source;
   a photodetector that receives at least one part of light from said semiconductor laser light source;
   a light reflection element provided with a peripheral section that reflects peripheral light of the light from said semiconductor laser light source and condenses it into said photodetector and a central section that transmits central light of the light from said semiconductor laser light source; and
   a condenser lens that condenses the light that passes through said light reflection element onto an optical disc,
   wherein:
     each surface of the central section of said light reflection element has a flat shape;
     at least one surface of the peripheral section of said light reflection element has a spherical or non-spherical curved shape, the spherical or non-spherical curved shape forming a surface of rotation about the central section of the light reflecting element;
     both surfaces of the central section of said light reflection element are parallel and inclined at a predetermined angle with respect to a direction perpendicular normal to an optical axis of the light from said semiconductor laser light source; and
     the astigmatism produced by the inclined placement of the central section of said light reflection element compensates the astigmatic difference of said semiconductor light source.

4. The optical head apparatus according to claim 1, wherein:
   both surfaces of the central section of said light reflection element are parallel and inclined at a predetermined angle with respect to a direction perpendicular to an optical axis of the light from said semiconductor laser light source; and the astigmatism produced by the inclined placement of the central section of said light reflection element compensates the astigmatic difference of said semiconductor laser light source.

5. The optical head apparatus according to claim 1, characterized in that one surface of the central section of said light reflection element is not parallel to the other surface.

6. The optical head apparatus according to claim 1, wherein the optical axis of the reflected light from the peripheral section of said light reflection element is inclined with respect to the optical axis of the light from said semiconductor laser light source.

7. The optical head apparatus according to claim 1, wherein said semiconductor laser light source and said photodetector are formed in one package.

8. The optical head apparatus according to claim 1, wherein:
   a first surface of the peripheral section of said light reflection element is nearer the semiconductor laser light source than a second surface of the peripheral section of said light reflection element; and
   the first surface has a flat shape and the second surface has the spherical or non-spherical curved shape.

9. An optical head apparatus, comprising:
   a semiconductor laser light source;
   a plurality of photodetectors placed adjacent to said semiconductor laser light source;
   a reflection type hologram element provided with a peripheral section that reflects and diffracts peripheral light of the light from said semiconductor laser light source and condenses it into one or said plurality of photodetectors and a central section that transmits central light of the light from said semiconductor laser light source; and
   a condenser lens that condenses the light that passes through the central section of said reflection type hologram element onto an optical disc,
   wherein:
     said photodetector that receives said reflected and diffracted light is placed closer, with respect to said semiconductor laser light source, in the direction of the major axis of an ellipse than in the direction of the minor axis of the ellipse of an elliptic far field pattern of outgoing light from said semiconductor laser light source; and
     the photodetector that receives signal light from said optical disc is placed closer, with respect to said semiconductor laser light source, in the direction of the minor axis of the ellipse than in the direction of the major axis of the ellipse of an elliptic far field pattern of outgoing light from said semiconductor laser light source.

10. The optical head apparatus according to claim 9, wherein said reflection type hologram element reflects and diffracts more light in the direction of the major axis of the ellipse than light in the direction of the minor axis of the ellipse of the elliptic far field pattern of outgoing light from said semiconductor laser light source.

11. The optical head apparatus according to claim 9, wherein the hologram formation area of said reflection type hologram element is formed more widely in the direction of the major axis of the ellipse with respect to the center of the axis of the elliptic far field pattern of said semiconductor laser.

12. The optical head apparatus according to claim 10, wherein the hologram formation area of said reflection type hologram element is formed more widely in the direction of the major axis of the ellipse with respect to the center of the axis of the elliptic far field pattern of said semiconductor laser.

13. The optical head apparatus according to claim 9, wherein the condensing function of the peripheral section of said reflection type hologram element has an astigmatic difference.

14. The optical head apparatus according to claim 10, wherein the condensing function of the peripheral section of said reflection type hologram element has an astigmatic difference.

15. The optical head apparatus according to claim 9, wherein the condensing function of the peripheral section of said reflection type hologram element has a spherical aberration.

16. The optical head apparatus according to claim 10, wherein the condensing function of the peripheral section of said reflection type hologram element has a spherical aberration.

17. The optical head apparatus according to claim 9, wherein:
   both surfaces of the central section of said reflection type hologram element are parallel;
   these surfaces are inclined at a predetermined angle with respect to the direction perpendicular to the optical axis of the light from said semiconductor laser light source; and
   the astigmatism produced by the inclined placement of the central section of said reflection type hologram element compensates the astigmatic difference of said semiconductor laser light source.

18. The optical head apparatus according to claim 10, wherein:
   both surfaces of the central section of said reflection type hologram element are parallel;
   these surfaces are inclined at a predetermined angle with respect to the direction perpendicular to the optical axis of the light from said semiconductor laser light source; and
   the astigmatism produced by the inclined placement of the central section of said reflection type hologram element compensates the astigmatic difference of said semiconductor laser light source.

19. The optical head apparatus according to claim 9, wherein one plane of the central section of said reflection type hologram element is not parallel to the other plane.

20. The optical head apparatus according to any one of claim 10, wherein one plane of the central section of said reflection type hologram element is not parallel to the other plane.

21. The optical head apparatus according to claim 9, wherein the optical axis of reflected and diffracted light from the peripheral section of said reflection type hologram element is inclined with respect to the optical axis of light from said semiconductor laser light source.

22. The optical head apparatus according to claim 10, wherein the optical axis of reflected and diffracted light from the peripheral section of said reflection type hologram element is inclined with respect to the optical axis of light from said semiconductor laser light source.

23. The optical head apparatus according to claim 9, wherein said semiconductor laser light source and a plurality of photodetectors provided adjacent thereto are formed in one package.

24. The optical head apparatus according to claim 9, further comprising a polarized hologram element that allows light from said laser light source to penetrate and the light reflected by said optical disc to diffract, wherein:
   said polarized hologram element is mounted on a movable part of an objective lens actuator together with an objective lens; and
   the light transmission area of the central section of said reflection type hologram element has a quasi-elliptic shape whose major axis lies in the direction of the tracking operation of said objective lens actuator.

25. The optical head apparatus according to claim 9, further comprising a polarized hologram element that allows light from said laser light source to penetrate and the light reflected by said optical disc to diffract,
   wherein said polarized hologram element is integrated with said reflection type hologram element.

26. The optical head apparatus according to claim 9, wherein:
   the light condensing point by said reflection type hologram element is apart from the plane of a photoreception element of said photodetector at a room temperature;
   the light condensing point moves by wavelength fluctuations due to temperature variations; and
   said light condensing point aligns with the plane of said photoreception element in the vicinity of a mid point of the operating temperature range of said optical head apparatus.

27. The optical head apparatus according to claim 9, wherein the hologram formation area of said reflection type hologram element is formed asymmetric with respect to a point centered on the optical axis of the light from said semiconductor laser light source.

28. An optical head apparatus, comprising:
   a semiconductor laser light source;
   a photodetector that receives at least one part of light from said semiconductor laser light source;
   a light reflection element provided with a peripheral section that reflects peripheral light of the light from said semiconductor laser light source and condenses it into said photodetector and a central section that transmits central light of the light from said semiconductor laser light source; and
   a condenser lens that condenses the light that passes through said light reflection element onto an optical disc,
   wherein:
      both surfaces of the central section of said light reflection element have a flat shape and are parallel;
      normals of both surfaces of the central section of said light reflection element are inclined at a predetermined angle with respect to a direction of an optical axis of the light from said semiconductor laser light source; and
      astigmatism produced by the inclined placement of the central section of said light reflection element compensates an astigmatism difference of said semiconductor laser light source.

* * * * *